United States Patent
Jonas et al.

Patent Number: 6,084,040
Date of Patent: Jul. 4, 2000

[54] SCRATCH-RESISTANT CONDUCTIVE COATINGS

[75] Inventors: Friedrich Jonas, Aachen; Klaus Lerch; Udo Guntermann, both of Krefeld, all of Germany

[73] Assignee: Bayer AG, Germany

[21] Appl. No.: 08/907,937

[22] Filed: Aug. 12, 1997

[30] Foreign Application Priority Data

Aug. 19, 1996 [DE] Germany .......................... 196 33 311

[51] Int. Cl.$^7$ ................................. C08L 65/00
[52] U.S. Cl. .................... 525/535; 525/474; 525/535; 525/103
[58] Field of Search ................... 525/474, 535, 525/103

[56] References Cited

U.S. PATENT DOCUMENTS

| | | | |
|---|---|---|---|
| 4,315,091 | 2/1982 | Steinberger et al. | 528/28 |
| 5,300,575 | 4/1994 | Janas et al. | 525/186 |
| 5,370,981 | 12/1994 | Krafft et al. | 430/529 |
| 5,372,924 | 12/1994 | Quintens et al. | 430/527 |
| 5,721,299 | 2/1998 | Angelopooulos et al. | 524/177 |

FOREIGN PATENT DOCUMENTS

| | | |
|---|---|---|
| 805 474 | of 0000 | European Pat. Off. . |
| 0017187 | 10/1980 | European Pat. Off. . |
| 0440957 | 8/1991 | European Pat. Off. . |
| 0686662 | 12/1995 | European Pat. Off. . |
| 4211459 | 10/1993 | Germany . |
| 4229192 | 3/1994 | Germany . |
| 19524132 | 1/1997 | Germany . |

OTHER PUBLICATIONS

Derwent English Abstract for EP 686,662 (Dec. 13, 1995). (See CA 2,148,544 already of record).
Derwent English Abstract for EP 440 957 (Mar. 10, 1993). (See U.S. 5,300,575 already of record).
Derwent English Abstract for DE 42 11 459 (Oct. 7, 1993).
Derwent English Abstract for DE 195 24 132 (Jan. 9, 1997).

*Primary Examiner*—David W. Wu
*Assistant Examiner*—Caixia Lu-Rutt
*Attorney, Agent, or Firm*—Connolly Bove Lodge & Hutz LLP

[57] ABSTRACT

Coatings of electrically conductive polythiophene salts, polythiophene$^+$/An$^-$, and hydrolyzable silanes, wherein the polythiophene group contains positively charged and uncharged recurring units of the formula (I):

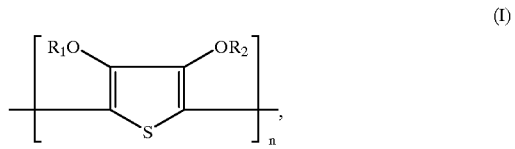

where, n is an integer from 5 to 100, and $R_1$ and $R_2$, independently of one another, represent hydrogen, an optionally substituted alkyl group having 1 to 20 carbon atoms, —CH$_2$—OH, or an aryl group having 6 to 14 carbon atoms, or $R_1$ and $R_2$, together, represent an optionally substituted alkylene group having 1 to 20 carbon atoms, and An$^-$ means a polyanion, and wherein the silanes have been hydrolyzed in the presence of the conductive polythiophene salts, and the use thereof for the production of scratch-resistant electrically conductive coatings.

11 Claims, No Drawings

SCRATCH-RESISTANT CONDUCTIVE COATINGS

BACKGROUND OF THE INVENTION

1. Field of the Invention

The present invention relates to scratch-resistant, electrically conductive or anti-static coatings for electrically non-conductive moulded parts made of glass or plastics materials. More particularly, the coatings are made from combinations of partially hydrolyzed silanes and conductive polythiophene coatings.

2. Description of the Prior Art

Moulded parts made of glass and plastics material are electrostatically charged by friction or the application of charges (for example electron radiation in television picture tubes). These charges attract dust particles so that the moulded parts rapidly gather dust. Therefore, these moulded parts must be protected against electrostatic charging. This can be achieved, for example, by means of an antistatic coating with a surface resistance of $<10^{10}$ $\Omega/\square$. If the surface resistance of the coatings is $<1,000$ $\Omega/\square$, the antistatic effect is accompanied by a shielding effect against electromagnetic/electrostatic radiation.

For practical uses these coatings must also possess adequate mechanical resistance and adhesive strength. In particular, when glass is used as carrier, (the layers must be sufficiently scratch-resistant in order that, during the cleaning of the coated surfaces, damage to the coating, and thus loss of the antistatic or conductive effect, can be avoided.)

The literature has disclosed electrically conductive polymers, for example, polythiophenes, for the production of antistatic or conductive coatings.

From EP-A 440 957 and DE OS 4 211 459, it is known to use coatings of polythiophene containing a polythiophene salt polythiophene$^+$/An$^-$, wherein the polythiophene$^+$ group contains positively charged and uncharged recurring units of the formula (I):
wherein
   n represents an integer from 5 to 100, and
   $R_1$ and $R_2$, independently of one another, represent hydrogen, an optionally substituted alkyl group having 1 to 20 carbon atom, —$CH_2$—OH, or an aryl group having 6 to 14 carbon atoms, or
   $R_1$ and $R_2$, together, represent an optionally substituted alkylene group having 1 to 20 carbon atoms, and
   An$^-$ means a polyanion,
for the production of conductive or antistatic coatings.

The use of these polythiophene salts for the antistatic finishing of glass has been described in DE-OS 4 229 192.

However, it has been shown that in practice these coatings are not sufficiently scratch-resistant for some applications. Therefore, the object existed of modifying the polythiophene coatings in such manner as to obtain a scratch resistance which is adequate under practical conditions.

In DE-A 19 524 132, it is proposed to add binding agents which cure through ionizing radiation to the polythiophene salt coatings in order to improve scratch resistance. However, these combinations are also insufficiently scratch-resistant for practical applications of the conductive coatings, e.g.; as an antistatic finish for cathode ray tubes for televisions or monitors.

Additionally, EP-A 17 187 has disclosed scratch-resistant coatings based on hydrolyzed silanes. However, it has been shown that these, are incompatible with the conductive polythiophene salt coatings.

SUMMARY OF THE INVENTION

It was discovered that combinations of hydrolyzable silanes and the above mentioned conductive polythiophene coatings can be processed to form scratch-resistant coating if the silanes compounds are hydrolyzed in the presence of the polythiophene coatings.

Therefore, the invention provides a strongly adherent, scratch-resistant, electrically conductive or antistatic coating for electrically non-conductive moulded parts made of glass or plastic material based on the above-mentioned polythiophene coatings and hydrolyzable silanes.

DESCRIPTION OF THE PREFERRED EMBODIMENTS

Tetraalkoxysilanes and alkyl- or aryltrialkoxysilanes are used as silanes.

The hydrocarbon-trialkoxysilanes to be hydrolyzed correspond to the general formula (II):

$$R'Si(R''O)_3 \qquad (II),$$

wherein
   R' means an alkyl group having 1 to 4 carbon atoms, a phenyl- or vinyl group, and R" is an alkyl group having 1 to 4 carbon atoms. Methyltriethoxysilane is preferred.

The tetraalkoxysilanes to be hydrolyzed correspond to the general formula III)

$$Si(R''O)_4 \qquad (III),$$

wherein
   R" has the meaning given above.

The coatings according to the invention contain 0.1 to 200%, preferably 1 to 50%, conductive polythiophene salt relative to the dry residue of the hydrolyzable silanes.

Preferably, 3,4-polyethylene dioxythiophene/polystyrene sulphonate is used as the conductive polythiophene salt.

Fillers, for example, silicon dioxide, titanium dioxide, and zinc oxide, can be added to the coatings according to the invention. Preferably, fillers with particle sizes of $<0.5$ $\mu m$, e.g., colloidal silicon dioxide, are used for the production of transparent coatings.

The coatings according to the invention can contain additives which improve the adhesion to the respective substrate. Epoxysilanes, such as 3-glycidoxypropyltrimethoxysilane, have proved successful for application to glass.

For application to plastics materials, for example, blocked isocyanates or etherified methylolmelamines, such as those used in EP-A 17 187, are suitable.

Water-miscible solvents, for example, alcohols, such as methanol, ethanol, propanol, and isopropanol, and glycols, ketones, such as acetone and methylethylketone, amides, such as N,N-dimethylformamide, N,N-dimethylacetamide, and N-methylpyrrolidone can be added to the coatings according to the invention.

The coatings according to the invention can be produced by adding the individual components to the polythiophene coating by stirring. For the hydrolysis of the silanes, the coatings are stirred at temperatures of 0° C. to 100° C., preferably, 20° C. to 50° C. In general, time intervals of a few minutes up to a few hours are required.

The coatings according to the invention can be applied in accordance with known procedures, e.g., by printing processes, such as gravure printing, flexographic printing, and silk-screen printing, scraping-on, roller application systems, curtain coating, or by, spraying or spin-coating.

The applied layers can be dried at 20° C. to 300° C., preferably, at 40° C. to 200° C.

Depending upon the desired surface resistance, after the evaporation of the solvents the layer thickness of the coating amounts to 0.05 to 100 μm, preferably, 0.05 to 30 μm.

The adjustable surface resistances of the coatings are between $10^{10}$ and 0.1 Ω/□, preferably, between $10^8$ and 100 Ω/□.

In order to achieve low surface resistances of <400 Ω/□, compounds containing di- or polyhydroxy- and/or carboxylic acids or amide- or lactam groups, such as sorbitol, can be added to the coatings according to the invention, as described in EP-A 686 662.

Organic or inorganic acids can be added to the coatings according to the invention in order to accelerate the hydrolysis of the silanes compounds.

Suitable inorganic acids are, for example, hydrochloric acid, sulphuric acid, hydrofluoric acid, and nitric acid.

Suitable organic acids are, for example, aliphatic or aromatic carboxylic acids, for example, acetic acid, propionic acid, and benzoic acid, and aliphatic or aromatic sulphonic acids, e.g., methane sulphonic acid and toluene sulphonic acid.

0 to 20 wt. % acid, relative to the hydrolyzable silane compound, can be added.

The following will be mentioned as substrates which can be provided with a scratch-resistant, conductive coating in accordance with the process according to the invention: moulded bodies and sheets made of plastics materials, e.g., polyolefins such as polyethylene, and polypropylene, polyesters and such as polyethylene terephthalate and polyethylene naphthalate, polystyrene, polycarbonate, ABS, polyacrylates, polyacrylonitrile, cellulose derivatives, such as cellulose acetate, polyamides, polyvinylchloride, and optionally, glass-fibre-reinforced epoxide resin plastics, or copolymers and blends thereof. The coatings according to the invention are particularly suitable for the scratch-resistant, antistatic finishing of inorganic moulded bodies made, for example, of glass or ceramic, such as aluminium oxide ceramic or silicon nitride ceramic. The preparations according to the invention are preferably used for the antistatic or conductive coating of glass cathode ray tubes.

The coatings according to the invention are characterised by a high degree of transparency and scratch resistance. The coated moulded bodies attract dust to a distinctly reduced extent. Furthermore, the plastic material or glass coated in accordance with the invention are suitable for the shielding of electromagnetic radiation, for example, from television picture tubes.

COMPARISON EXAMPLE 10 g of a 3,4-polyethylene dioxythiophene/polystyrene sulphonate solution (BAYTRON® P of Bayer AG Leverkusen) with a solids content of 1.3 wt. % is mixed by stirring with 5.4 g of a partially hydrolyzed silane solution based on tetraethoxysilane and methyltriethoxysilane in accordance with Example c2 of EP 17 187. Here, solid particles form in the solution, i.e., the solution can no longer be processed into clear, transparent layers.

EXAMPLE 1

35.4 g of a 3,4 polyethylene dioxythiophene/polystyrene sulphonate solution (BAYTRON® P of Bayer AG Leverkusen) with a solids content of 1.3 wt. % is mixed by stirring with 4.4 g tetraethoxysilane 3.5 g methyltrimethoxysilane 35.4 g isopropanol 14.1 g deionised water and 7.1 g 0.1 molar hydrochloric acid, and the componets are then stirred for 6 hours. A clear solution is obtained, which after filtration through a 5 μm cloth can be used directly for the coating of glass.

EXAMPLE 2

34.5 g of a 3,4 polyethylene dioxythiophene/polystyrene sulphonate solution (BAYTRON® P of Bayer AG Leverkusen) with a solids content of 1.3 wt. % is mixed by stirring with 5.2 g tetraethoxysilane 3.5 g methyltrimethoxysilane 35.0 g isopropanol 13.8 g deionised water and 8.7 g 0.1 molar hydrochloric acid, and the components are then stirred for 6 hours. A clear solution is obtained, which after filtration through a 5 μm cloth can be used directly for the coating of glass.

EXAMPLE 3

19.25 g of a 3,4 polyethylene dioxythiophene/polystyrene sulphonate solution (BAYTRON® P of Bayer AG Leverkusen) with a solids content of 1.3 wt. % is mixed by stirring with 1.0 g tetraethoxysilane 10.0 g isopropanol 19.5 g deionised water and 0.25 g 3-glycidoxypropyltrimethoxysilane, and the components are then stirred for 1.5 hours. A clear solution is obtained, which can be used directly for the coating of glass.

EXAMPLE 4

38.5 g of a 3,4-polyethylene dioxythiophene/polystyrene sulphonate solution (BAYTRON® P of Bayer AG Leverkusen) with a solids content of 1.3 wt. % is mixed by stirring with 1.0 g tetraethoxysilane 10.0 g isopropanol and 0.5 g 3-glycidoxypropyltrimethoxysilane, and the components are then stirred for 1.5 hours. A clear solution is obtained, which can be used directly for the coating of glass.

EXAMPLE 5

42.9 g of a 3,4-polyethylene dioxythiophene/polystyrene sulphonate solution (BAYTRON® P of Bayer AG Leverkusen) with a solids content of 1.3 wt. % is mixed by stirring with 9.7 g N-methylpyrrolidone 0.9 g 3-glycidoxypropyltrimethoxysilane and 53.6 g isopropanol, and the components are then stirred for 30 minutes at room temperature. A clear solution is obtained, with can be used directly for the coating of glass.

Application Examples

Surface resistance was determined according to DIN IEC 93, pencil hardness according to ASTM D 3363-92a, and gloss according to ASTM D 523.

1) Using a lacquer centrifuge, the solution according to Example 3 is applied by spin-coating at 750 rpm to a 10×10 cm² glass plate, and then dried with warm air at 50° C. After 24 hours at room temperature, the surface resistance was determined by means of painted-on conductive silver electrodes, and the scratch resistance was determined.
Surface resistance: $3 \times 10^5$ Ω/□
Pencil hardness: >4H.

2) Using a lacquer centrifuge, the solution according to Example 4 is applied by spin-coating at 750 rpm to a 10×10 cm² glass plate, and then dried with warm air at 50° C. After 24 hours at room temperature, the surface resistance was determined by means of painted-on conductive silver electrodes, and the scratch resistance was determined.
Surface resistance $5 \times 10^6$ Ω/□
Pencil hardness 6H.

3) Using a compressed air spray gun, the solution according to Example 1 was sprayed onto a 30×30 cm² glass plate, and then dried for 30 minutes at 170° C. The application thickness after drying amounts to 1,500 mg/m². After 24 hours at room temperature, the surface resistance was determined by means of painted-on conductive silver electrodes, and the scratch resistance was determined.
Surface resistance: $1 \times 10^5$ Ω/□
Pencil hardness: 9H.

4) Using a compressed air spray gun, the solution according to Example 2 was sprayed onto a 30×30 cm² glass plate, and then dried. The application thickness after drying amounts to 1,600 mg/m². After 24 hours at room temperature, the surface resistance was determined by means of painted-on conductive silver electrodes, and the scratch resistance was determined.
Surface resistance: $2 \times 10^5$ Ω/□
Pencil hardness>: 8H.

5) Using a compressed air spray gun, the solution according to Example 5 was sprayed onto a 30×30 cm² glass plate, and then dried for 5 minutes at 80° C. Subsequently, a solution according to Example 1 is mixed with 2.1 g N-methylpyrrolidone and sprayed onto the plate as a second layer. After evaporation of the solvent at room temperature, the plate is dried for 30 minutes at 170° C. The application thickness after drying amounts to 1.4 g/m². After 24 hours at room temperature, the surface resistance was determined by means of painted-on conductive silver electrodes, and the scratch resistance was determined.
Surface resistance: $4 \times 10^3$ Ω/□
Pencil hardness: 9H.

6) Using a compressed air spray gun, the solution according to Example 5 was sprayed onto a 30×30 cm² glass plate, heated to 80° C., and then dried for 5 minutes at 80° C. Subsequently, a solution according to Example 1 is mixed with 1.3 g glycerin and sprayed onto the plate as a second layer. After evaporation of the solvent at room temperature, the plate is dried for 30 minutes at 170° C. The application thickness after drying amounts to 1.5 g/m². After 24 hours at room temperature, the surface resistance was determined by means of painted-on conductive silver electrodes, and the gloss and the scratch resistance were determined.
Surface resistance: $2 \times 10^3$ Ω/□
Pencil hardness: 9H
Gloss at 60°:77%

7) The solution according to Example 1 is diluted with 2.1 N-methylpyrrolidone and then sprayed onto a 30×30 cm² glass plate preheated to 80° C. using a compressed air spray gun. After evaporation of the solvent at room temperature, the glass plate, is dried for 30 minutes at 170° C. The application thickness after drying amounts to 1,600 mg/m² . After 24 hours at room temperature the surface resistance was determined by means of painted-on conductive silver electrodes, and the gloss and the scratch resistance were determined.
Surface resistance: $2 \times 10^5$ Ω/□
Pencil hardness: 9H
Gloss at 60°:60%

What is claimed is:

1. A coating composition comprising an electrically conductive polythiophene salt and a hydrolyzable tetraalkoxysilane having the formula (III):

$$(Si)(R''O)_4 \quad (III),$$

where R'' is an alkyl group having 1 to 4 carbon atoms, wherein the polythiophene salt has the formula:
polythiophene$^+$/An$^-$, the polythiophene$^+$ group comprising positively charged and uncharged recurring units having the formula (I):

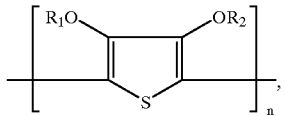

where,
n is an integer from 5 to 100, and
$R_1$ and $R_2$, independently of one another, represent hydrogen, an optionally substituted alkyl group having 1 to 20 carbon atoms, —CH$_2$—OH, or an aryl group having 6 to 14 carbon atoms, or
$R_1$ and $R_2$, together, represent an optionally substituted alkylene group having 1 to 20 carbon atoms,
the An$^-$ group comprising a polyanion, and the hydrolyzable tetraalkoxysilane having been hydrolyzed in the presence of the polythiophene salt.

2. The coating composition according to claim 1, wherein the polythiophene$^+$ group is 3,4-polyethylene dioxythiophene$^+$.

3. The coating composition according to claim 1, wherein the An$^-$ group is polystyrene sulphonate$^-$.

4. The coating composition according to claim 1, wherein the polythiophene salt is 3,4-polyethylene dioxythiophene$^+$/polystryrene sulphonate$^-$.

5. The coating composition according to claim 1, further comprising a compound selected from the group consisting of a dihydroxy acid, a polyhydroxy acid, a carboxylic acid, an amide, a lactam, and a mixture thereof.

6. The coating composition according to claim 1, further comprising a compound selected from the group consisting of a filler, an additive, a water-miscible solvent, an organic acid, an inorganic acid, and a mixture thereof.

7. The coating composition according to claim 1, further comprising about 0 to 20% by weight, based on the hydrolyzable tetraalkoxysilane, of an organic or inorganic acid.

8. The coating composition according to claim 1, wherein the polythiophene salt is present in the amount of about 0.1 to 200% by weight, based on a dry residue of the hydrolyzable tetraalkoxysilane.

9. The coating composition according to claim 8, wherein the polythiophene salt is present in the amount of about 1 to 50% by weight, based on a dry residue of the hydrolyzable tetraalkoxysilane.

10. A method of making a scratch-resistant, electrically conductive or anti-static coating, the method comprising admixing an electrically conductive polythiophene salt and a hydrolyzable tetraalkoxysilane such that the tetraalkoxysilane is hydrolyzed in the presence of the polythiophene salt, the polythiophene salt having the formula: polythiophene$^+$/An$^-$, the polythiophene$^+$ group comprising positively charged and uncharged recurring units having the formula (I):

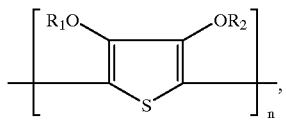

where, n is an integer from 5 to 100,

R$_1$ and R$_2$, independently of one another, represent hydrogen, an optionally substituted alkyl group having 1 to 20 carbon atoms, —CH$_2$—OH, or an aryl group having 6 to 14 carbon atoms, or R$_1$ and R$_2$, together, represent an optionally substituted alkylene group having 1 to 20 carbon atoms, and the An$^-$ group comprising a polyanion.

11. A coating composition comprising a product prepared by the method according to claim 10.